United States Patent [19]

Angelo et al.

[11] Patent Number: 5,923,754
[45] Date of Patent: Jul. 13, 1999

[54] COPY PROTECTION FOR RECORDED MEDIA

[75] Inventors: Michael F. Angelo, Houston; Daniel J. Driscoll, Spring, both of Tex.

[73] Assignee: Compaq Computer Corporation, Houston, Tex.

[21] Appl. No.: 08/850,729

[22] Filed: May 2, 1997

[51] Int. Cl.$^6$ ...................................................... H04L 9/00
[52] U.S. Cl. .................................. 380/4; 380/21; 380/44; 380/45
[58] Field of Search .................................. 380/4, 21, 44, 380/45

[56] References Cited

U.S. PATENT DOCUMENTS

| | | | |
|---|---|---|---|
| 5,081,676 | 1/1992 | Chou et al. | 380/4 |
| 5,319,705 | 6/1994 | Halter et al. | 380/4 |
| 5,337,357 | 8/1994 | Chou et al. | 380/4 |
| 5,398,285 | 3/1995 | Borgelt et al. | 380/30 |
| 5,513,260 | 4/1996 | Ryan | 380/3 |
| 5,615,264 | 3/1997 | Kazmierczak et al. | 380/4 |
| 5,719,938 | 2/1998 | Haas et al. | 380/21 |
| 5,784,460 | 7/1998 | Blumenthal et al. | 380/4 |

OTHER PUBLICATIONS

"Public Key vs. Private–Key"; Internet, http://www.mathcs.carleton.edu/students/ginderj/Advan.html; Oct. 30, 1996; p. 1 of 1.
"RSA: A Brief Rundown"; Internet, http://www.mathcs.carleton.edu/students/ginderj/RSA.html;; Oct. 30, 1996; p. 1 of 1.
"Patenting Cryptography Systems"; Internet, http://www.mathcs.carleton.edu/students ginderj/tech.html; Oct. 30, 1996; p. 1 of 1.
"Public–Key Encryption"; Internet, http://www.mathcs.carleton.edu/students/ginderj/PublicKey.html; Oct. 30, 1996; p. 1 of 1.
"Encryption"; Internet, http://www.mathcs.carleton.edu/students/ginderj/Encrypt.html; Oct. 30, 1996; p. 1 of 1.
"Conventional data encryption key (DEK) 'packet'"; Internet, http://www.chemistry.mcmaster.ca/pgp/pgformat/pgformat_11.html#0; May 22, 1994; p. 1 of 1.
"Conventional key encrypted data packet"; Internet, http://www.chemistry.mcmaster.ca/pgp/pgformat/pgformat_12.html#0; May 22, 1994; p. 1 of 1.
"DVD Overview"; Internet, http://www.nbeng.com/html/dvd2.htm#today; Oct. 21, 1996; pp. 1–5.
"DVD Copy Protection: An Agreement at Last?" by Dana J. Parker; *Standard Deviation;* Internet, http://www.onlineinc.com/cdrompro/1296CP/standard12.html; Dec. 11, 1996; pp. 1–3.
"Multimedia PCS: Video" by Mike Feibus; Ziff–Davis Publishing Company; Lexis:Nexis; Oct. 1996; pp. 3–6.
"A Day at the DVD Forum: technical notes" by C. Fogg; Internet, http://reality.sgi.com/nemec/dvd.htm; Apr. 22, 1996; pp. 1–24.

*Primary Examiner*—Gail O. Hayes
*Assistant Examiner*—Hrayr A. Sayadian
*Attorney, Agent, or Firm*—Jenkens & Gilchrist

[57] ABSTRACT

A method and apparatus for securely transferring an encrypted-data key and a medium key, from a media storage such as a DVD disk to an output device in a computer system, using a randomly generated first secure transfer key generated by a disk drive of the computer system, the first key having a uniqueness factor derived from a phase locked loop circuitry. The first secure transfer key is combined with an output key stored in the output device forming a second secure transfer key. The second secure transfer key is used to encrypt the data key and the medium key to form a third secure transfer key. The third secure transfer key is passed to the output device where the data key and the medium key are decrypted. The data key and the medium key are then used by the output device to decrypt encrypted program data from the disk.

16 Claims, 3 Drawing Sheets

COPY PROTECTION FOR RECORDED MEDIA

BACKGROUND OF THE INVENTION

DVD is generally a technology designed to replace current compact disks or CD-ROMs. There are generally two types of DVDs. The first type is constructed very similarly to current CD-ROMs with two significant distinctions. The first distinction between current CD-ROMs and DVDs involves how the data is represented. Although, data is represented on both the DVD and the CD-ROM as pits, the pits on the DVD are about one half the size of the pits on the CD-ROM (0.4 microns versus 0.83 microns). The second distinction between current CD-ROMs and DVDs involves the placement of the data or the track size. On the DVD, the tracks are much closer than that of the current CD-ROMs (0.74 microns versus 1.6 microns). These two distinctions alone enable the DVD to store nearly seven times the capacity of current CD-ROMs (4.7 GB versus 650 MB).

The second type of DVD differs from the first type of DVD by the utilization of a second layer beneath the top layer on which additional data can be stored. A special coating is used on the first layer that allows the laser to access the data on the second layer. The two layer format offers up to 8.5 GB of data storage.

Unlike most uses of current CD-ROMs, it is contemplated that both sides of the DVD can and will ultimately be used to store data. When using both sides of a DVD having the two layer format there is potential for 17 GB of storage on a single disk. However, the initial DVDs anticipated to be introduced into the public will utilize the 4.7 GB format. As described above, because the data pits on DVDs are closer together than they are on conventional CD-ROMs, the initial DVD drives will offer data transfer rates of 1.35 MBps, which is equivalent to that of current 9× CD-ROM drives. This will be accomplished with a DVD drive having a spin rate about as fast a current 4× CD-ROM drives.

One of the highly anticipated applications for DVDs is in the Motion Picture industry. A full-length motion picture will be compressed onto a DVD using an algorithm known as MPEG-2 (Motion Pictures Experts Group). However, as with other forms of data storing media, such as current computer CD-ROMs and floppy disks, and laser disks and video tapes for movies, one of the main items of concern is the unauthorized copying and distribution of the data. This will be especially true with DVDs. Because the data is digitally stored on a DVD, copies of the DVD can be made without any degradation such that every copy of a DVD is indistinguishable from the original.

As can be appreciated, it is therefore highly desirable to have a copy-protection system for data recorded on various media, such as DVDs, that provides a high level of copy protection in a manner that is extremely difficult or prohibitively expensive and time consuming to defeat.

SUMMARY OF THE INVENTION

The present invention overcomes the above identified problems as well as other shortcomings and deficiencies of existing technologies by providing a method and apparatus for copy protecting information a recorded medium such as a DVD by defining and negotiating device keys during the power-on phase of a playback system such as a computer or a DVD system and by utilizing the device keys for protecting and securely transferring the product keys associated with the encrypted data and the recorded medium from the disk to the output controller of the playback system.

The present invention further provides a method and apparatus for securely transferring an encrypted-data key and a media key, from a media storage device such as a DVD disk to an output device in a computer controlled system, using a randomly generated first secure transfer key generated by a disk drive of the computer controlled system. The first secure transfer key is combined with an output key stored in the output device forming a second secure transfer key. The second secure transfer key is used to encrypt the data key and the media key to form a third secure transfer key. The third secure transfer key is passed to the output device where the data key and the media key are decrypted. The data key and the media key are then used by the output device to decrypt encrypted program data from the disk.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
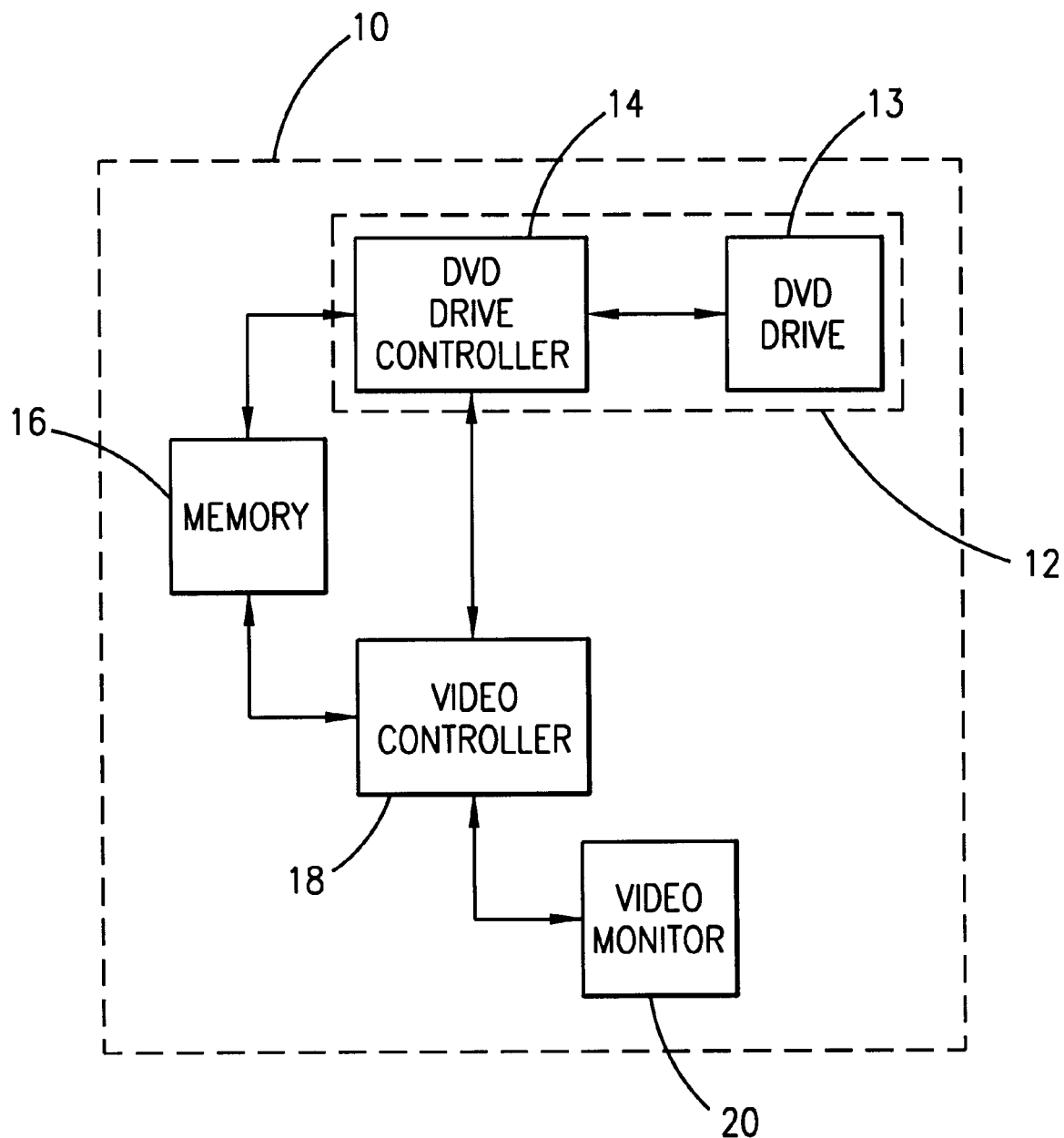
FIG. 1 is a block diagram illustrating a system utilizing the present invention.

The present invention relates to a method and apparatus for copy-protecting various data storing media, such as a data stored on a DVD. The present invention is not limited to DVD media, and is contemplated that one of ordinary skill in the art could utilize the present invention in other types of data storing media such as CD-ROMs, magnetic tape and magnetic floppy disks.

As will be evident from the detailed description given below, a recapitulation of some conventional encryption methods will be useful for a more complete understanding of the present invention. Encryption in general deals with the transformation of data into a coded form. Normally the coded data is parameterized by one or more keys. A common form of encryption, known as symmetrical encryption, uses a single key to both encrypt and decrypt the data. The encryption/decryption key is shared by all users. A major disadvantage of symmetrical encryption is that the key must be kept absolute secret from all non-users to ensure system integrity. Therefore, security is provided only to the extent that the single key is known solely by the users and maintained secret.

Another common form of encryption is known as a public-key or asymmetric encryptions system. The public-key or asymmetric encryption system, differs from symmetrical encryption systems in that each user has their own key set. Each key set comprises two components; a private key, and a public key. Each person's public key is posted while the private key is kept secret. All communication utilizing this type of encryption involves only the public keys, the private keys are never transmitted or shared, helping to maintain system integrity. The recipient's public key is used to encrypt the data to be transmitted or shared. The data is sent to the recipient, whereby only the recipients private key can be used to decrypt the data. An advantage of this type of encryption is that the knowledge of the key used for encryption is insufficient to allow messages to be decrypted.

A well known public key cryptosystem is the RSA public key cryptosystem (U.S. Pat. No. 4,405,829). In general, the RSA system operates as follows: first two very large prime numbers P and Q chosen, from which their product N is computed (N=PQ); next an integer E is chosen, which is less than N and relatively prime to (Q-1)(P-1); the inverse D of E is then calculated, whereby ED=1 mod (P-1)(Q-1). The public key is the pair N and E; the private key is D. P and Q are usually kept secret or destroyed. The security of RSA is predicated on the assumption that it is difficult to calculate P from a knowledge of Q. Therefore the sizes of the keys are chosen to reduce the possibility of factoring.

A third common type of encryption is known as a hybrid encryption. The hybrid encryption, in general, combines private key encryption and public key encryption. In operation, a temporary key called a session key, is created to encrypt the data using a private-key encryption. The recipient's public key is used to encrypt the session key and then the session key is sent along with the encrypted data to the recipient. Once the encrypted session key is received, the recipient decrypts the key using the private key and then uses the session key to decrypt the data.

These above described encryption systems are intended to be exemplary of and not limited to the types of encryption techniques that can be utilized in the present invention as described herein below.

Figure 2:
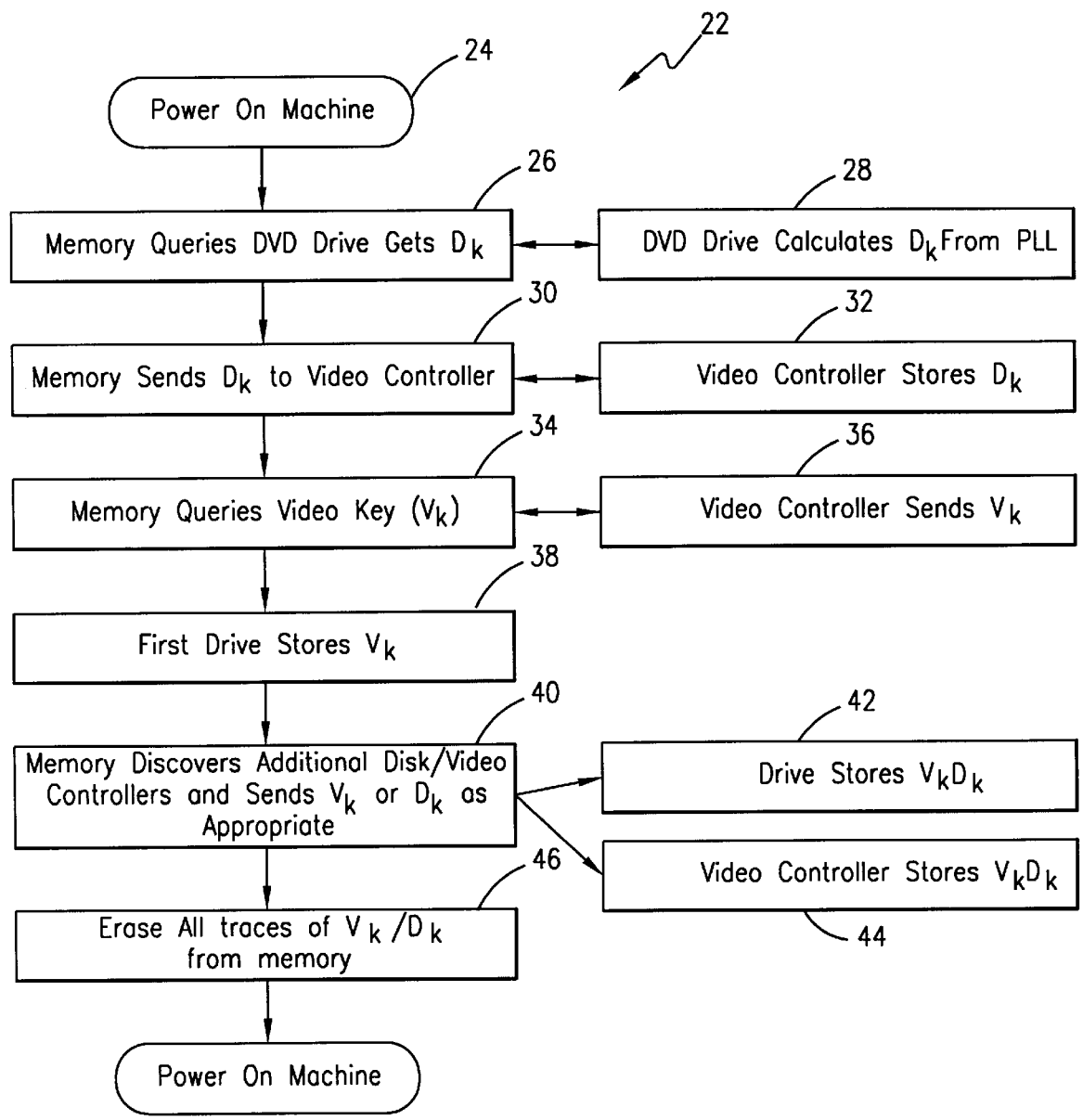
FIG. 2 is a flow control block diagram illustrating the defining and negotiating of device keys during power-on post of the system as illustrated in FIG. 1.
Figure 3:
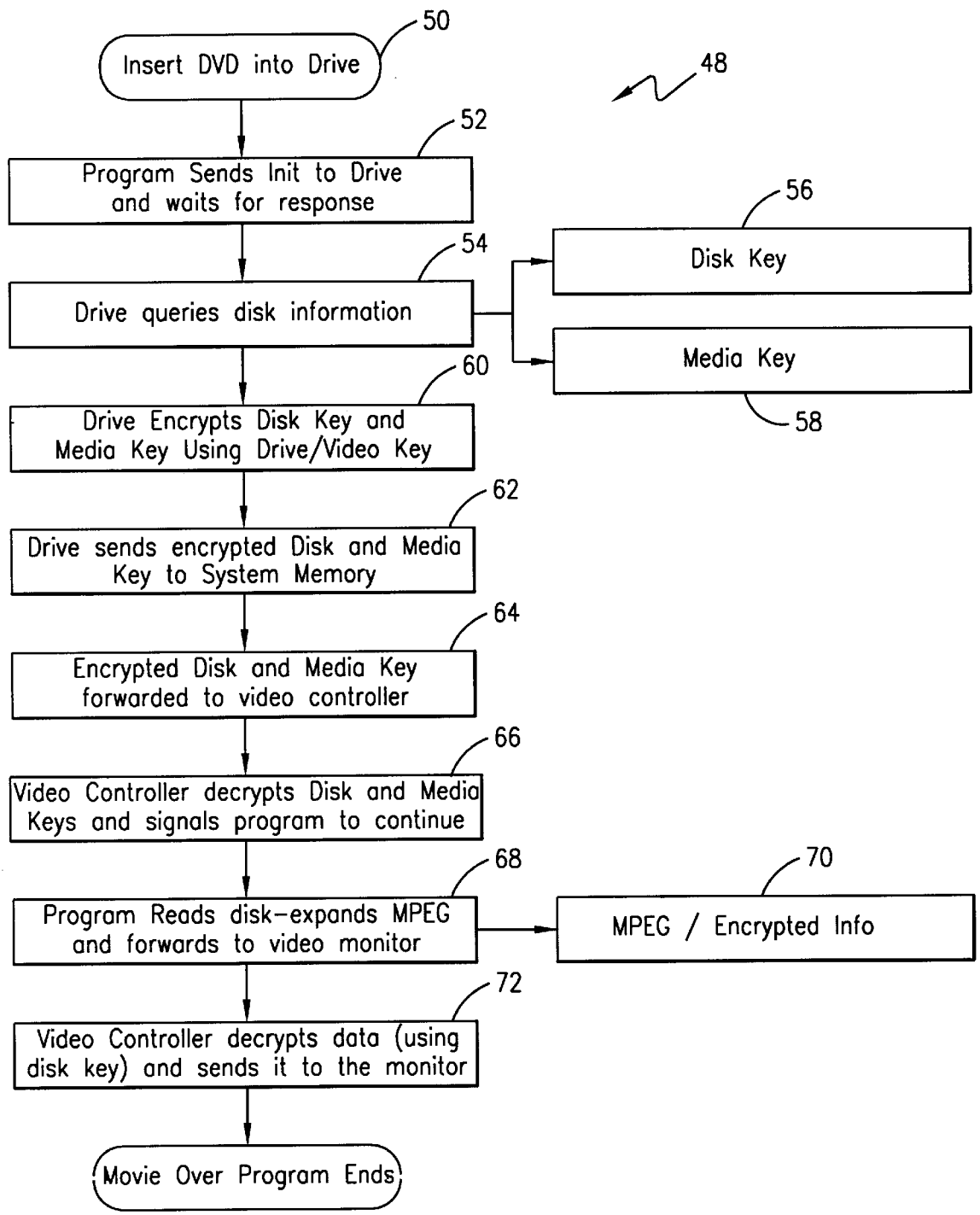
FIG. 3 is a flow control block diagram illustrating a method of operation of the present invention.

With reference now to the figures there are depicted diagrams with FIG. 1 illustrating system diagram of a DVD system in accordance with the utilization of the present invention, and FIGS. 2 and 3 illustrating flow control block diagrams of the present invention.

Referring now to FIG. 1, there is shown a system diagram illustrating a DVD system 10. DVD system 10 includes a DVD drive 12, which includes a DVD drive slot 13, for receiving the DVD disk, and a DVD drive controller 14. DVD system 10 further includes memory 16, video controller 18 and a video monitor 20. In general operation, a DVD disk containing data, such as a movie, is placed DVD drive slot 13 of DVD drive 12, whereby the data is read by the DVD drive controller 14 and transferred to video controller 18. The data is processed by the video controller 18 and the corresponding data is output or displayed on video monitor 20. Although good results have been achieved by utilizing video controller 18 to process the data, it is contemplated that software could also be used, in conjunction with a microprocessor, to process the data.

The present invention provides copy protection for the DVD disk such that unauthorized duplication of the data or disk is very difficult or prohibitively expensive and time consuming to do so. The copy protection (described in more detail below), in general is accomplished as follows: the data is first encrypted and then encoded (such as by MPEG-2) and stored on the disk, with at least two keys associated the encryption (a disk key and a media key), the product of these keys are then encrypted with a private DVD device key generated by the DVD drive 12 and the video controller 18; the encrypted and encoded data and associated disk keys are then securely transmitted to the video controller 18; the DVD disk key is decrypted in the video controller, such that the encrypted data from the DVD disk can be decoded, decrypted and then ultimately displayed on video monitor 20.

Referring now to FIG. 2, there is depicted a block flow diagram 22 illustrating the defining and negotiating of device keys during the power-on reset of DVD system 10. As indicated by block 24, the power to DVD system 10 turned on. Then as indicated by block 26, memory 16 of DVD system 10 queries DVD drive 12 to obtain a drive key. Then as indicated from block 28, DVD drive 12 calculates a unique drive key, $D_k$, from the phase lock loop (PLL) of the DVD drive. Drive key, $D_k$, is a combination of the disk key stored on the media, and a uniqueness factor derived from the PLL of the DVD drive. A new drive key, $D_k$, is generated every time DVD system 10 is powered on. This prevents reply attacks or repeated attempts to guess the drive key. In DVD drive 12, the rotational rate of the media is controlled by a phase lock loop circuit monitored by a digital signal processor. The PLL has a specific frequency range associated with its initial track capture setting. By taking advantage of the differences in the PLL range a unique or random drive key can be generated every time the system is powered on.

Then, as indicated by block 30, the memory 16 of DVD system 10 sends $D_k$ to video controller 18. Thereafter, as indicated by block 32, video controller 18 stores $D_k$. Then, as indicated by block 34, memory 16 of DVD system 10 queries video controller 18 for a video key, $V_k$. Thereafter, as indicated by block 36, memory 16 sends $V_k$ to DVD drive 12. Upon receipt of $V_k$, DVD drive 12 stores $V_k$, as indicated by block 38.

Then, as indicated by block 40, a determination is made by the DVD system 10 as to whether it has any additional DVD drives or additional video controllers. If the determination is made that there exists additional DVD drives or additional video controllers, $V_k$ and $D_k$ are sent to any additional drives and controllers accordingly, as indicated by blocks 42 and 44. The device key is established as the product of $V_k D_k$ and is stored in all of the DVD drives and video controllers. Once this is complete, all traces of $V_k$ and $D_k$ are erased from system memory as indicated by block 46.

Referring now to FIG. 3, there is depicted a block flow diagram 48 illustrating the negotiating of the disk key, media key and device key during operation of DVD system 10. As indicated by block 50, a DVD disk is placed into DVD drive 12. Then, as indicated by block 52, the system program send an initiation command do DVD drive 12 and waits for a response. Thereafter, as indicated by block 54, DVD drive 54 then queries the disk for key information, such as the disk harmonic key or disk key, $d_{kh}$, and the media key, $d_{km}$ and indicated by block 56 and 58. The DVD drive 12 combines $d_{kn}$ with $d_{km}$ to generate an encrypted disk/media key ($d_k$) as represented by the formula $d_k = d_{kh} d_{km}$.

The disk key is a key unique to that individual disk, and has certain physical aspects which make it extremely difficult or prohibitively expensive and time consuming to decode or copy. The media key is a key which corresponds to a particular piece of data stored on the disk. For example, if a commercially produced DVD disk contained three encrypted movies stored on it, each of the three movies would have a key associated therewith, and each copy of the disk would have its own unique disk key.

Then, as indicated by block 60, DVD drive 12 encrypts the disk/media key $d_k$ using the drive and video keys, yielding $V_k D_k (d_k)$. As indicated by blocks 62–66, $V_k D_k (d_k)$ is then communicated to the video controller 18, where the video controller decrypts $V_k D_k (d_k)$ to obtain $d_k$. Then, as indicated by blocks 68 and 70, DVD system 10 retrieves the corresponding data from the disk, decodes the MPEG coded data, and forwards the data to video controller 18. Thereafter, as indicated by block 72, video controller 18 decrypts the encrypted data using disk/media key, $d_k$, and sends the movie or corresponding output to video monitor 20. The above described process continues until all of the corresponding data has been retrieved, decoded, decrypted and displayed.

Although the invention described herein as been described in conjunction with a movie DVD system, it is understood that the present invention could be utilized in DVD systems within other types of electronic devices, such as personal and network computer, as well as personal and commercial audio systems.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing form the spirit of the invention as set forth and defined by the following claims.

What is claimed is:

1. A method of securely transferring a disk key and a media key, from a media storage to an output device in a computer system, the output device having an output device key associated therewith, said method comprising the steps of:

generating a first random secure transfer key with a uniqueness factor derived from phase lock loop circuitry;

forming a second secure transfer key by combining the secure transfer first key with the output device key;

forming a third secure transfer key by using the second secure transfer key to encrypt the disk key and the media key; and transferring the third secure transfer key to the output device.

2. The method as recited in claim 1, wherein said step of generating the first secure transfer key occurs during power-on of the computer system and further, a unique first secure transfer key is generated during each power-on of the computer system.

3. The method as recited in claim 1, further comprising the step of deleting the first secure transfer key subsequent to the step of generating the second secure transfer key.

4. The method as recited in claim 1, further comprising the step of recovering the encrypted-data key and the media key from the third secure transfer key in the output device.

5. The method as recited in claim 1, wherein the step of generating the first secure transfer key is generated by a disk drive.

6. The method as recited in claim 6, wherein the disk drive is a digital versatile disk drive.

7. A method of providing copy protection during the transfer of a media key and a disk key of a previously recorded disk containing encrypted data, from the disk to an output controller of a playback device, the output controller having an output controller key associated therewith, said method comprising the steps of:

generating a first random secure transfer key in the playback device with a uniqueness factor derived from phase lock loop circuitry;

forming a second secure transfer key by combining the first secure transfer key with the output controller key;

forming a third transfer key by using the second secure transfer key to encrypt the media key and the disk key; and transferring the third secure transfer key to the output controller.

8. The method as recited in claim 7, wherein the play back device includes a disk drive, and further wherein said step of generating a first random secure transfer key is generated by the disk drive.

9. The method as recited in claim 8, wherein said first secure transfer key is generated during power-on of the play back device and further, a unique first secure transfer key is generated during each power-on of the computer system.

10. The method as recited claim 7, further comprising the step of deleting the first secure transfer key subsequent to the step of generating the second secure transfer key.

11. The method as recited in claim 10, further comprising the step of decrypting the media key and the disk for the third secure transfer key in the output controller.

12. A copy protection apparatus comprising:

a data storage medium having encrypted data stored thereon, said encrypted data having a data key associated therewith, said data key stored on said data storage medium, said data storage medium includes a data storage medium key associated therewith;

a playback device including a media access device and an output device, said media access device accessing the encrypted data stored on said data storage medium and accessing said data key and said data storage medium key;

said output device having a output device key associated therewith;

means for generating a first secure random transfer key with a uniqueness factor derived from phase lock loop circuitry;

means for generating a second secure transfer key by combining said first secure transfer key with said output device key; and means for generating a third secure transfer key by using said second secure transfer key to encrypt said data storage medium key and said data key;

wherein subsequent to said third key being generated, said third key is transferred to said output device whereupon said data key and said data storage medium key are decrypted.

13. The apparatus as recited in claim 12, wherein said data storage medium includes a ROM disk.

14. The apparatus as recited in claim 13, wherein said media access device includes a ROM disk drive.

15. The apparatus as recited in claim 14, wherein said means for generating a first secure transfer key is responsive to a power-on of said playback device and further said means for generating a first secure transfer key generates a unique first secure transfer key during each power-on of the computer system.

16. The apparatus as recited in claim 15, wherein said ROM disk drive is a DVD disk drive.

* * * * *